2,870,176
// Patented Jan. 20, 1959

2,870,176
PREPARATION OF STIGMASTEROL MATERIAL

Max H. Stern and Orris D. Hawks, Rochester, N. Y., assignors to Eastman Kodak Company, Rochester, N. Y., a corporation of New Jersey No Drawing. Application October 7, 1954
Serial No. 461,010

8 Claims. (Cl. 260—397.25)

This invention relates to the preparation of stigmasterol material and more particularly to the preparation of stigmasterol-enhanced phytosterol fractions from phytosterol concentrates containing substantial amounts of stigmasterol.

The naturally occurring phytosterol components of vegetable oils are comprised of mixed phytosterols which have similar chemical and physical properties, thus making the separation of the individual phytosterols difficult. As in the case of such oils as soybean oil, where the mixed phytosterol component is composed of about 25% stigmasterol, about 70% sitosterol and about 5% miscellaneous phytosterols, the separation of a stigmasterol enhanced fraction is complicated as stigmasterol is reported to differ structurally from the major constituent in the phytosterol fraction, sitosterol, by only a double bond in the side chain. Sitosterol is reported to have the formula

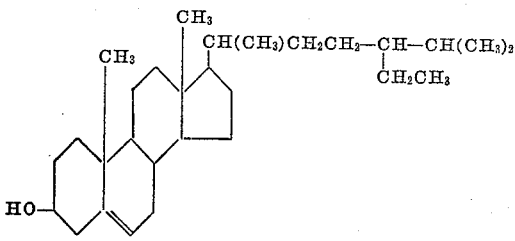

and stigmasterol is reported to have the formula

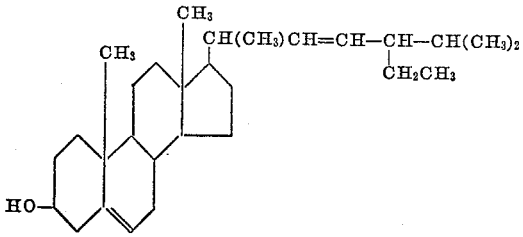

The separation of such compounds has long been of interest. Windaus and Hauth (Ber. 39, 4378, 1906) separated stigmasterol from other phytosterols such as sitosterol by brominating a mixture of sterol acetates, crystallizing out the relatively insoluble stigmasterol acetate tetrabromide, and separating stigmasterol therefrom. However, this bromination procedure is not entirely satisfactory for a large scale commercial separation of stigmasterol as it is a relatively costly process. The Windaus and Hauth bromination method, although relatively expensive, has been for many years the classical or commonly used method for preparing stigmasterol or for separating stigmasterol from sitosterol. However, with an increased commercial demand for stigmasterol for use in the preparation of certain pharmaceuticals such as sex hormones, cortisone and the like, a simple, inexpensive and more commercially feasible process than the classical Windaus and Hauth bromination method is needed.

Accordingly, it is an object of this invention to prepare stigmasterol material by a new and commercially feasible process.

It is another object of this invention to prepare a phytosterol fraction of enhanced stigmasterol content from a phytosterol concentrate derived principally from soybean oil by a new and improved process.

It is another object of this invention to prepare a phytosterol fraction of enhanced stigmasterol content from a phytosterol concentrate containing a phytosterol component comprised principally of sitosterol and containing a substantial amount of stigmasterol by a new and improved process.

It is another object of this invention to prepare an esterified phytosterol fraction of enhanced stigmasterol ester content from esterified phytosterol concentrates by a new and improved process.

It is another object of this invention to prepare a stigmasterol-enhanced phytosterol fraction from a phytosterol concentrate containing a phytosterol component comprised of more than about 15% stigmasterol by a new and improved process.

It is another object of this invention to prepare by a novel and economically feasible process, a stigmasterol fraction containing up to about 90% stigmasterol from a phytosterol concentrate containing a phytosterol component comprised of more than about 15% stigmasterol, the balance of the phytosterol component being principally sitosterol.

It is another object of this invention to prepare substantially pure stigmasterol material by a novel means.

It is an additional object of this invention to prepare by a new and improved process substantially pure stigmasterol from a phytosterol concentrate containing a phytosterol component comprised of more than about 15% stigmasterol.

It is a further object of this invention to prepare a sitosterol-enhanced fraction and a stigmasterol-enhanced fraction from a phytosterol concentrate containing a phytosterol component comprised of a substantial amount of sitosterol and a substantial amount of stigmasterol by a new and improved process.

These and other objects are attained by means of this invention as described more fully hereinafter with particular reference to preferred embodiments thereof and as defined in the appended claims.

As used herein, the generic terms, "stigmasterol material," "sitosterol material," and "phytosterol material," refer to both the esterified and the unesterified forms of the respective sterol alcohol moieties.

The present process involves a selective crystallization method for preparing concentrates of stigmasterol material. It has been considered by those skilled in sterol chemistry that crystallization alone could not be used to separate stigmasterol from a mixed phytosterol composition. Hershberg, in U. S. Patent No. 2,520,143 entitled "Isolation of Stigmasterol," commented on page 1, column 1, lines 5 to 8:

"It has long been known that crystallization alone does not effect a separation of the stigmasterol from other phytosterols in crude soybean sterols or from their acetyl derivatives."

Thus, it was wholly unobvious and unexpected when it was found that stigmasterol materials could be separated from mixtures of phytosterol materials in accordance with the present process.

By dissolving in a non-polar solvent a concentrate of phytosterol material comprised of either phytosterols or substantially uniformly esterified phytosterols and containing substantial amounts of stigmasterol material, a fraction enhanced in stigmasterol material can be selectively crystallized therefrom in accordance with the present process. Successive recrystallizations of the resulting stigmasterol material-enhanced crystals from a non-polar solvent results in a high purity stigmasterol material composition.

Concentrates of phytosterol material derived from soybean oil are more generally employed in the present process because of their relatively high stigmasterol content in addition to their ready commercial availability. Likewise, other concentrates of phytosterol material derived from legume oils such as calabar bean oil, kidney bean oil, castor bean oil, and the like, can be employed in the present process, although concentrates derived from other vegetable oils and which contain substantial amounts of stigmasterol material can also be employed.

Concentrates of phytosterol material used in the present process can be prepared by any of the well-known methods of sterol concentration such as steam deodorization, solvent wintering, solvent extraction, high vacuum distillation, adsorption and similar concentrating methods. As the natural occurring phytosterol material component in most vegetable oils is a mixture of sterols and sterol esters, a saponification or hydrolysis step employed to produce unesterified sterols in the concentrate usually precedes or follows the sterol concentrating method. A preferred method for preparing phytosterol material concentrates is to employ deodorizer sludges derived from the steam deodorization of vegetable oils containing stigmasterol material. Substantially pure phytosterols can be obtained from deodorizer sludges by a process which comprises saponifying the sludge, acidulating the resulting saponified composition, removing the resulting glycerine-containing phase and thereafter wintering out the sterols at about —20° C. from such polar solvents as acetone, methyl alcohol, isopropyl ether and the like. Another particularly effective means for preparing substantially pure phytosterols from deodorizer sludges is to convert the fatty acid moiety in the deodorizer sludge to fatty acid esters of lower monohydric alcohols, either by alcoholysis or by direct esterification of the saponified and acidulated fatty acid esters, and thereafter wintering out the phytosterols from the resulting lower ester composition.

While substantially pure concentrates of phytosterol material are preferably used, concentrates containing substantial amounts of oleaginous materials such as fatty acids, fatty acid soaps, tocopherols and other non-phytosterol materials can also be utilized.

Concentrates comprised of unesterified phytosterols are preferably employed in the present invention, although phytosterol concentrates which have been substantially uniformly esterified with such acylating or esterifying agents as acetic anhydride, palmityl chloride, benzoyl chloride and the like can also be used. The term, "substantially uniformly esterified," refers to sterol alcohol moieties which have been substantially completely esterified with the same ester-forming radical. For example: if a substantially pure phytosterol concentrate derived from soybean oil and comprised of about 25% stigmasterol and about 70% sitosterol is substantially completely esterified with acetic anhydride to form a substantially uniformly esterified composition comprised of stigmasterol acetate and sitosterol acetate, a stigmasterol acetate-enhanced fraction can be readily prepared therefrom by selective crystallization in accordance with the present process. The crystallized stigmasterol acetate-enhanced fraction can thereafter be saponified or hydrolyzed and the unesterified phytosterol readily separated.

The above described substantially uniformly esterified phytosterols are to be distinguished from naturally occurring phytosterol components found in vegetable oils. Such naturally occurring phytosterol components are usually mixtures of phytosterols and phytosterol esters, the phytosterol esters themselves often containing several different fatty acid moieties. Such naturally occurring phytosterol components which have not been substantially converted to phytosterols, or have not been esterified in a substantially uniform manner, are not particularly suitable for the present invention.

Concentrates of phytosterol material which contain substantial amounts of stigmasterol material are employed in the present process, with concentrates containing phytosterol material components comprised of about 15% to about 90% stigmasterol material being particularly effective, and with phytosterol material components containing more than about 20% stigmasterol material being more generally employed. Phytosterol material concentrates containing phytosterol material components comprised of less than about 15% and more than about 90% stigmasterol material can be employed, although less desirably, as individual crystallizations from such concentrations do not enhance the crystallized fraction with stigmasterol material by an appreciable amount.

Any of the well-known non-polar solvents can be employed, such as, light mineral oils; petroleum ether fractions, with petroleum ether fractions boiling in the range of about 30° C. to about 150° C. being preferred; hydrocarbons containing from 5 to 9 carbon atoms, with hexane and heptane being particularly effective; non-polar aromatic hydrocarbons such as toluene, benzene, and similar aromatic solvents; halogenated hydrocarbons such as ethylene dichloride; and such relatively non-polar solvents as higher fatty acids and lower esters of higher fatty acids such as butyl oleate, ethyl palmitate, propyl stearate, methylated fatty acids derived from soybean oil, and the like.

Concentrates comprised essentially of phytosterols are generally dissolved at an elevated temperature in the above non-polar solvents so as to form a solution comprised of from about 5 to about 35% by weight phytosterol, although higher or lower concentrations of phytosterol can be employed, the concentration varying with the particular solvent and the cooling temperature at which the stigmasterol enhanced fraction is crystallized therefrom. Esterified phytosterol concentrates, being relatively more non-polar than unesterified phytosterols, can be dissolved in even higher concentrations in the non-polar crystallizing solvent.

A preferred method for effecting the selective crystallization of stigmasterol material is to cool a dissolved concentrate of phytosterol material to a temperature so that a stigmasterol material-enhanced fraction can be selectively crystallized therefrom. For example, if a 5 to 35% concentration of phytosterol containing a substantial amount of stigmasterol is made in a non-polar solvent such as toluene or hexane by refluxing until the phytosterol is dissolved, and thereafter the solution is cooled to about room temperature, a stigmasterol-enhanced fraction can be selectively crystallized from the solvent in relatively high yields. By cooling such dissolved phytosterol fractions to intermediate temperatures between the boiling point of the solvent and room temperature, such as to a cooling temperature of about 35 to 45° C., higher concentrations of stigmasterol generally crystallize out, but usually in lower yields. The cooling of such dissolved phytosterol concentrates to temperatures below room temperature results in a loss of crystallizing selectivity, and at temperatures substantially below room temperature substantially all of the phytosterol crystallizes out of the solution without a stigmasterol enhancement. Stigmasterol enhancement, however, can be obtained by selective crystallization at temperatures substantially below room temperature by increasing the dilution of the dissolved phytosterol. For phytosterol concentrates which have been esterified, lower crystallizing temperatures can be employed. For example, phytosterol concentrates substantially uniformly esterified with acetic anhydride are preferably cooled below 0° C. to selectively crystallize out stigmasterol acetate enhanced fractions. Thus, the dissolved phytosterol concentrate can be cooled to any temperature at which a stigmasterol material-enhanced fraction can be acquired, with cooling temperatures of about room temperatures or between 20° C. and 30° C. being more generally employed with phytosterols, and lower cooling temperatures being more generally employed with esterified phytosterols.

While the crystallization is preferably effected by a controlled cooling of the dissolved material as described above, any of the other well-known methods of crystallization can also be employed, such as, producing supersaturation in the crystallizing composition by evaporation of a portion of the solvent under vacuum, by cooling the crystallizing composition in a vacuum by adiabatic evaporation, and by related methods of crystallization.

Filtration is more generally employed to separate the fractionally crystallized stigmasterol-enhanced crystals from the mother liquor, although any of the other well-known methods of separating solids from liquids such as, decanting, centrifuging, and the like, can also be employed.

Substantially anhydrous conditions are preferably maintained in the crystallizing solvent composition for the selective crystallization. Substantial amounts of water tend to decrease the selectivity of the present crystallization, particularly when the crystallizing solvent composition is agitated or stirred during the crystallization. However, small quantities of water, such as the water attendant in many commercial non-polar solvents, does not substantially effect the selective crystallization. A commonly used method for obtaining substantially anhydrous conditions in a crystallizing solvent composition containing substantial amounts of water is to subject the dissolved phytosterol concentrate to a partial distillation to remove water as an azeotropic mixture with a small portion of the solvent prior to crystallization, thus producing more desirable conditions for the ensuing fractional crystallization.

To prepare substantially pure stigmasterol materials from concentrations of phytosterol material comprised of more than about 90% stigmasterol material, polar solvents such as acetone, methyl alcohol, isopropyl alcohol and the like can be more effectively employed than non-polar solvents as the crystallizing medium. For example: a 97–99% stigmasterol fraction can be obtained in a single crystallization from acetone of a phystolsterol concentrate comprised of about 90% stigmasterol, while a single crystallization of a 90% stigmasterol concentrate from a non-polar solvent, such as hexane, results in only a 1–2% enhancement of stigmasterol in the crystals. Thus, by using non-polar solvent crystallizing mediums to prepare fractions containing up to about 90% stigmasterol material, and thereafter changing to polar solvent crystallizing mediums, substantially pure stigmasterol material can be readily prepared.

Sitosterol is the most widely distributed and the most common phytosterol and thus is the major phytosterol component of the phytosterol concentrates described herein, apart from the stigmasterol component. Accordingly, by fractionally crystallizing a stigmasterol enhanced fraction from such phytosterol concentrates, a sitosterol enhanced fraction remains in the mother liquor and can be readily separated by removing the solvent. Similarly, sitosterol ester enhanced fractions can be prepared from substantially uniformly esterified phytosterol concentrates. Thus, the present process can be employed to separate fractions enhanced in sitosterol material as well as fractions enhanced in stigmasterol material.

EXAMPLE 1

A 2 kilogram sample of substantially pure soybean phytosterols, containing about 25% stigmasterol and having a melting point of 136° C. to 139° C., was dissolved in about 30 liters of commercial hexane (b. pt. 67–73° C.) by refluxing for a few minutes. The resulting solution was thereafter cooled to 25° C. with stirring and kept at that temperature for about an hour. A stigmasterol-enhanced fraction crystallized from the cooled solution and was separated from the hexane solvent by filtration. The stigmasterol-enhanced fraction was redissolved in commercial hexane at a ratio of 1 kilogram of stigmasterol-enhanced fraction to 15 liters of hexane, recrystallized at 25° C., and separated from the hexane solvent. Three further recrystallizations were made in a similar manner to prepare a stigmasterol fraction containing about 89% stigmasterol. The crystallizations were effected under substantially anhydrous conditions. The successive recrystallizations yielded the results shown in Table 1 regarding the crystallized stigmasterol-enhanced fractions.

*Table 1*

| Crystallization | Percent Stigmasterol by Infra-Red | Melting Point, Degrees Centigrade |
|---|---|---|
| (Starting Material) | 25 | 136–139 |
| 1st | 30 | 137–140 |
| 2nd | 37 | 144–146 |
| 3rd | 58 | 154–156 |
| 4th | 80 | 162–165 |
| 5th | 89 | 169–172 |

EXAMPLE 2

Portions of substantially pure phytosterol concentrates, derived from soybean oil and having stigmasterol to sitosterol ratios of 24/76, were dissolved in four different non-polar solvents at a ratio of about 1 part by weight of phytosterol to about 10 parts by weight of solvent, the solvents cooled, and stigmasterol-enhanced phytosterol concentrates selectively crystallized therefrom under substantially anhydrous conditions. The data in Table 2 represent the stigmasterol-enhanced crystals of a single crystallization from the respective solvents. Concentrations of stigmasterol and sitosterol were determined by infra-red assay.

*Table 2*

| Solvent | Crystallizing Temperature, ° C. | Stigmasterol To Sitosterol Ratio |
|---|---|---|
| (Starting Material) | | 24/76 |
| Light Mineral Oil | 38 | 38/62 |
| Petroleum Ether (B. pt. 60–100° C.) | 25 | 46/54 |
| Petroleum Ether (B. pt. 100–140° C.) | 25 | 40/60 |
| Ethylene Dichloride | 25 | 36/64 |

As illustrated, a wide variety of non-polar solvents can be employed to produce stigmasterol enhancement in accordance with the present process.

EXAMPLE 3

A deodorizer sludge made by steam deodorizing soybean oil was saponified with sodium hydroxide, acidulated with hydrochloric acid and the resulting glycerine-containing phase removed to produce an oleaginous mixture. The oleaginous mixture was comprised essentially of free fatty acids, tocopherols and phytosterols. The phytosterol component comprised about 25% by weight of the oleaginous mixture, the phytosterol component in turn being comprised of about 25% stigmasterol, about 70% sitosterol and about 5% miscellaneous phytosterols. The saponified and acidulated deodorizer sludge was thereafter dissolved in a non-polar solvent at a ratio of about 1 part by weight of the treated sludge to about 4 parts by weight of solvent, slowly cooled, and a stigmasterol-enhanced fraction selectively crystallized from the solvent under substantially anhydrous conditions. The data in Table 3 represent the stigmasterol-enhanced crystals of a single crystallization from two non-polar solvents. Concentrations of stigmasterol and sitosterol were determined by infra-red assay.

Table 3

| Solvent | Crystallizing Temperature, °C. | Percent Stigmasterol By Infra-Red |
|---|---|---|
| (Starting Material) | | 25 |
| Petroleum Ether (B. pt. 30–60° C.) | 25 | 30 |
| Commercial Hexane (B. pt. 67–73° C.) | 4 | 38 |

Thus, a stigmasterol-enhanced concentrate can be obtained by the present process directly from phytosterol concentrates containing substantial amounts of non-phytosterol oleaginous materials. Phytosterol fractions of greater stigmasterol enhancement can be obtained by recrystallization.

EXAMPLE 4

A substantially pure phytosterol concentrate derived from soybean oil was dissolved under substantially anhydrous conditions in commercial heptane (b. pt. 98–101° C.) so as to make a solution containing about 10% by weight of dissolved phytosterol concentrate. The resulting solution was thereafter allowed to cool down to room temperature (25° C.) overnight. A stigmasterol-enhanced phytosterol fraction crystallized out of the mother liquor and was separated by filtering. Thereafter the solvent was removed from the remaining mother liquor to recover a sitosterol-enhanced phytosterol fraction. Table 4 shows the stigmasterol enhancement in the crystals and the sitosterol enhancement in the mother liquor of the above single crystallization. Concentrations of stigmasterol and sitosterol were determined by infra-red assay.

Table 4

| | Starting Material | Crystals | Mother Liquor |
|---|---|---|---|
| Stigmasterol To Sitosterol Ratio | 25/75 | 35/65 | 15/85 |

As shown in Table 4, the present process can be utilized to recover sitosterol-enhanced phytosterol fractions as well as stigmasterol-enhanced phytosterol fractions from phytosterol concentrates.

EXAMPLE 5

A 500 g. sample of a phytosterol concentrate comprised of about 97% pure soybean phytosterols and containing a phytosterol component comprised of about 25% stigmasterol was dissolved in toluene so as to form a solution containing about 25% phytosterol. The resulting solution was cooled to room temperature (25° C.) and kept at that temperature for about an hour. A stigmasterol-enhanced fraction crystallized from the cooled solution. The data in Table 5 represents six succesvie recrystallizations from toluene using the same crystallization conditions as the initial crystallization. All of the crystallizations were effected under substantially anhydrous conditions.

Table 5

| Crystallization | Percent Stigmasterol By Infra-Red |
|---|---|
| (Starting Material) | 25 |
| 1st | 30 |
| 2nd | 38 |
| 3rd | 56 |
| 4th | 79 |
| 5th | 87 |
| 6th | 91 |
| 7th | 92 |

As shown in Table 5, when the concentration of stigmasterol exceeds about 90% stigmasterol, there was no appreciable stigmasterol enhancement with further crystallization.

EXAMPLE 6

Two stigmasterol-enhanced phytosterol fractions containing 89% and 91% stigmasterol were prepared from soybean oil phytosterols in accordance with the procedure described in Example 5. The two fractions were dissolved in acetone under substantially anhydrous conditions at a ratio of 1 part by weight of solute to 20 parts by weight of solvent, and thereafter slowly cooled to fractionally crystallize substantially pure stigmasterol fractions. Table 6 shows the results and conditions of the respective crystallizations from acetone.

Table 6

| Crystallizing Temperature | Percent Stigmasterol by Infra-Red | |
|---|---|---|
| | Starting Material | Crystals |
| | Percent | Percent |
| 25° C | 89 | 97 |
| 5° C | 91 | 98 |

Thus, by changing from a non-polar solvent to a polar solvent when crystallizing stigmasterol material-enhanced fractions containing more than about 90% stigmasterol material, substantially pure stigmasterol material can be prepared.

EXAMPLE 7

(a) A 10 g. sample of a 97% pure phytosterol concentrate derived from soybean oil and containing 28% stigmasterol was dissolved in 150 ml. of commercial heptane (b. pt. 98–101° C.) under substantially anhydrous conditions by refluxing for 15 minutes. The dissolved phytosterol concentrate was cooled slowly to room temperature with stirring. Thereafter, a stigmasterol-enhanced fraction crystallized out and was filtered from the mother liquor. A stigmasterol-enhanced fraction containing 34% stigmasterol was obtained.

(b) A second 10 g. sample of a 97% pure phytosterol concentrate derived from soybean oil and containing 28% stigmasterol was dissolved in 142.5 ml. of commercial heptane (b. pt. 98–101° C.) and 7.5 ml. of water (5% water) by refluxing for 15 minutes. The dissolved phytosterol concentrate was cooled slowly to room temperature with stirring and thereafter a stigmasterol-enhanced concentrate crystallized out and was filtered from the mother liquor. The stigmasterol-enhanced fraction contained 29.3% stigmasterol. Table 7 compares the data of the crystallization which was effected under substantially anhydrous conditions with the crystallization which was effected in the presence of about 5% water. The stigmasterol content was determined by infra-red assay.

Table 7

| | (a) Substantially Anhydrous | (b) 5% Water |
|---|---|---|
| Percent Stigmasterol in Starting Material | 28.0 | 28.0 |
| Percent Stigmasterol in Crystals | 34.0 | 29.3 |

As shown in Table 7, the selectivity of the crystallization is substantially decreased with the admixing of 5% water into the crystallizing solvent composition.

EXAMPLE 8

A 96% pure phytosterol concentrate derived from soybean oil and containing 25% stigmasterol (by infra-red assay) was substantially uniformly esterified with acetic anhydride to produce a phytosterol acetate concentrate. A 124.3 g. sample of the resulting esterified concentrate was dissolved in 500 ml. of commercial hexane (b. pt. 67–73° C.) and thereafter cooled to −20° C. overnight.

A stigmasterol acetate-enhanced fraction containing 33% stigmasterol acetate (by infra-red assay) crystallized out and was separated from the motor liquor by filtration. Substantially anhydrous conditions were maintained during the crystallization.

EXAMPLE 9

A substantially pure phytosterol concentrate derived from soybean oil and containing 28% stigmasterol (by infra-red assay) was substantially uniformly esterified with palmityl chloride to produce a phytosterol palmitate concentrate. A 58.5 g. sample of the resulting esterified concentrate was dissolved in 410 ml. of petroleum ether (b. pt. 60–100° C.) by refluxing for a few minutes. The resulting solution was thereafter allowed to come to room temperature (25° C.) overnight. A stigmasterol palmitate-enhanced fraction containing 36% stigmasterol palmitate (by infra-red assay) crystallized out and was separated from the mother liquor by filtration. Substantially anhydrous conditions were maintained during the crystallization.

EXAMPLE 10

A 50 g. sample of substantially pure soybean phytosterol containing 28% stigmasterol was dissolved in a 250 g. portion of methyl esters, such esters having been prepared by methylating fatty acids derived from soybean oil. The mixture was refluxed for a few minutes to dissolve the phytosterol and thereafter the resulting solution was allowed to cool to room temperature (25° C.) over a period of about two hours. A fraction containing a phytosterol component comprised of 39% stigmasterol crystallized from the cooled composition and was separated therefrom by filtration. Similarly, other lower esters of higher fatty acids as hereinabove disclosed, can be suitably employed as non-polar solvents in the present process.

It has been unexpectedly found that stigmasterol or stigmasterol ester-enhanced phytosterol material fractions can be prepared by selective crystallization in accordance with the present process. Further, the present process is a simple and inexpensive process which is readily adaptable to the commercial preparation of stigmasterol materials.

While the invention has been described in considerable detail with reference to certain preferred embodiments thereof, it will be understood that variations and modifications can be effected within the spirit and scope of the invention as described hereinabove and as defined in the appended claims.

We claim:

1. In the preparation of stigmasterol material, the process which comprises dissolving a concentrate of phytosterol material containing more than about 15% and less than about 90% by weight of stigmasterol material in a non-polar solvent, preparing a phytosterol material composition containing about 90% by weight of stigmasterol material by successive selective recrystallizations of said phytosterol material from said non-polar solvent under substantially anhydrous conditions from solutions of phytosterol material in said non-polar solvent at concentrations of 5% to 35% by weight of phytosterol material, dissolving the resulting recrystallized phytosterol material composition in a polar solvent and thereafter selectively crystallizing therefrom a phytosterol material concentrate further enhanced in a stigmasterol material.

2. The process according to claim 1 wherein the non-polar solvent is a petroleum ether fraction having a boiling point in the range of about 30° C. to 150° C.

3. The process according to claim 1 wherein the non-polar solvent is a hydrocarbon solvent containing 5 to 9 carbon atoms.

4. The process according to claim 1 wherein the polar solvent is acetone.

5. The process for preparing stigmasterol from a phytosterol concentrate derived from soybean oil and containing more than about 15% and less than about 90% by weight of stigmasterol which comprises preparing a phytosterol composition containing about 90% by weight of stigmasterol by successive selective recrystallizations of said phytosterol concentrate from a non-polar solvent by dissolving said phytosterol concentrate at elevated temperatures under substantially anhydrous conditions in said non-polar solvent to form solutions containing about 5% to about 35% by weight of phytosterol and by cooling the solutions to 20° C. to 30° C., dissolving the resulting recrystallized phytosterol composition in a polar solvent, and thereafter selectively crystallizing therefrom a phytosterol concentrate further enhanced in stigmasterol.

6. The process according to claim 5 wherein the non-polar solvent is a petroleum ether fraction having a boiling point in the range of about 30° C. to 150° C.

7. The process according to claim 5 wherein the non-polar solvent is a hydrocarbon solvent containing 5 to 9 carbon atoms.

8. The process according to claim 5 wherein the polar solvent is acetone.

References Cited in the file of this patent

UNITED STATES PATENTS

| | | |
|---|---|---|
| 2,499,430 | Vogel et al. | Mar. 7, 1950 |
| 2,679,503 | Christenson | May 25, 1954 |
| 2,772,297 | Lacquer | Nov. 27, 1956 |

UNITED STATES PATENT OFFICE

CERTIFICATE OF CORRECTION

Patent No. 2,870,176             January 20, 1959

Max H. Stern et al.

It is hereby certified that error appears in the printed specification of the above numbered patent requiring correction and that the said Letters Patent should read as corrected below.

Column 7, line 7, Table 3, third column thereof, second item, for the numeral "30" read -- 38 --; same table, same column, third item, for "38" read -- 30 --; column 9, line 3, for "motor" read -- mother --.

Signed and sealed this 2nd day of June 1959.

(SEAL)
Attest:
KARL H. AXLINE
Attesting Officer

ROBERT C. WATSON
Commissioner of Patents